United States Patent
Croak et al.

(10) Patent No.: US 7,450,502 B1
(45) Date of Patent: Nov. 11, 2008

(54) METHOD AND APPARATUS FOR MONITORING THE POTENTIAL IMPACT OF TRAFFIC SURGES

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 644 days.

(21) Appl. No.: 11/049,408

(22) Filed: Feb. 2, 2005

(51) Int. Cl.
*H04L 12/26* (2006.01)
*H04L 12/66* (2006.01)
*H04L 12/56* (2006.01)

(52) U.S. Cl. .......... 370/230; 370/352; 370/395.21; 379/221.07; 379/32.01; 379/112.01; 379/114.08; 379/133

(58) Field of Classification Search ............... 370/230, 370/237, 902; 379/15, 32.01, 112.01, 114.08, 379/133, 221.07, 265.02
See application file for complete search history.

(56) References Cited

U.S. PATENT DOCUMENTS 5,537,611 A * 7/1996 Rajagopal et al. ...... 379/221.07
5,978,465 A * 11/1999 Corduroy et al. ....... 379/265.02
6,965,562 B2 * 11/2005 Tuomi ........................ 370/230

OTHER PUBLICATIONS

Traffic Analysis for Voice over IP☐☐Cisco.*
Playing the numbers: using ACD statistics for workforce management☐☐Matan.*

* cited by examiner

*Primary Examiner*—Steven H D Nguyen
*Assistant Examiner*—Nishant B Divecha

(57) ABSTRACT

The present invention enables a graphical display of network call volumes in a predefined period before and after network alarm indications that show serious service disruptions to help determine if surges in call volumes precipitated the service disrupting event. When a surge of call volumes occurs and subsides, the graphical display of current network call volumes can be compared against historical trends of normal call traffic volumes and rates. The network will be placed in a high alert state and monitored for the predefined period of time. If the comparison shows aberrations between the historical trends and the current trend within the predefined period time window, then the network operator will be informed to take actions.

3 Claims, 5 Drawing Sheets

METHOD AND APPARATUS FOR MONITORING THE POTENTIAL IMPACT OF TRAFFIC SURGES

The present invention relates generally to communication networks and, more particularly, to a method and apparatus for monitoring the potential impact of traffic surges in packet switched networks, e.g., Voice over Internet Protocol (VoIP) networks.

BACKGROUND OF THE INVENTION

Brief surges or spikes in call volumes in a VoIP network can often produce cascading events that lead to serious service disruptions that may not occur instantly with the overload condition. For example, an unusual, rapid increase in call volumes may be caused by a one-time event that is quickly over but gradually produces service deteriorations due to increases in queue size and limitations in capacity in a subset of network elements. It is sometimes difficult for network operators to detect the root cause of cascading network problems produced by surges since they often do not occur in parallel with the traffic spike.

Therefore, a need exists for a method and apparatus for monitoring the potential impact of traffic surges in packet switched networks, e.g., Voice over Internet Protocol (VoIP) networks.

SUMMARY OF THE INVENTION

In one embodiment, the present invention enables a graphical display of network call volumes in a predefined period before and after network alarm indications that show serious service disruptions to help determine if surges in call volumes precipitated the service disrupting event. When a surge of call volumes occurs and subsides, the graphical display of current network call volumes can be compared against historical trends of normal call traffic volumes and rates. The network will be placed in a high alert state and monitored for the predefined period of time. If the comparison shows aberrations between the historical trends and the current trend within the predefined period time window, then the network operator will be informed to take actions.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
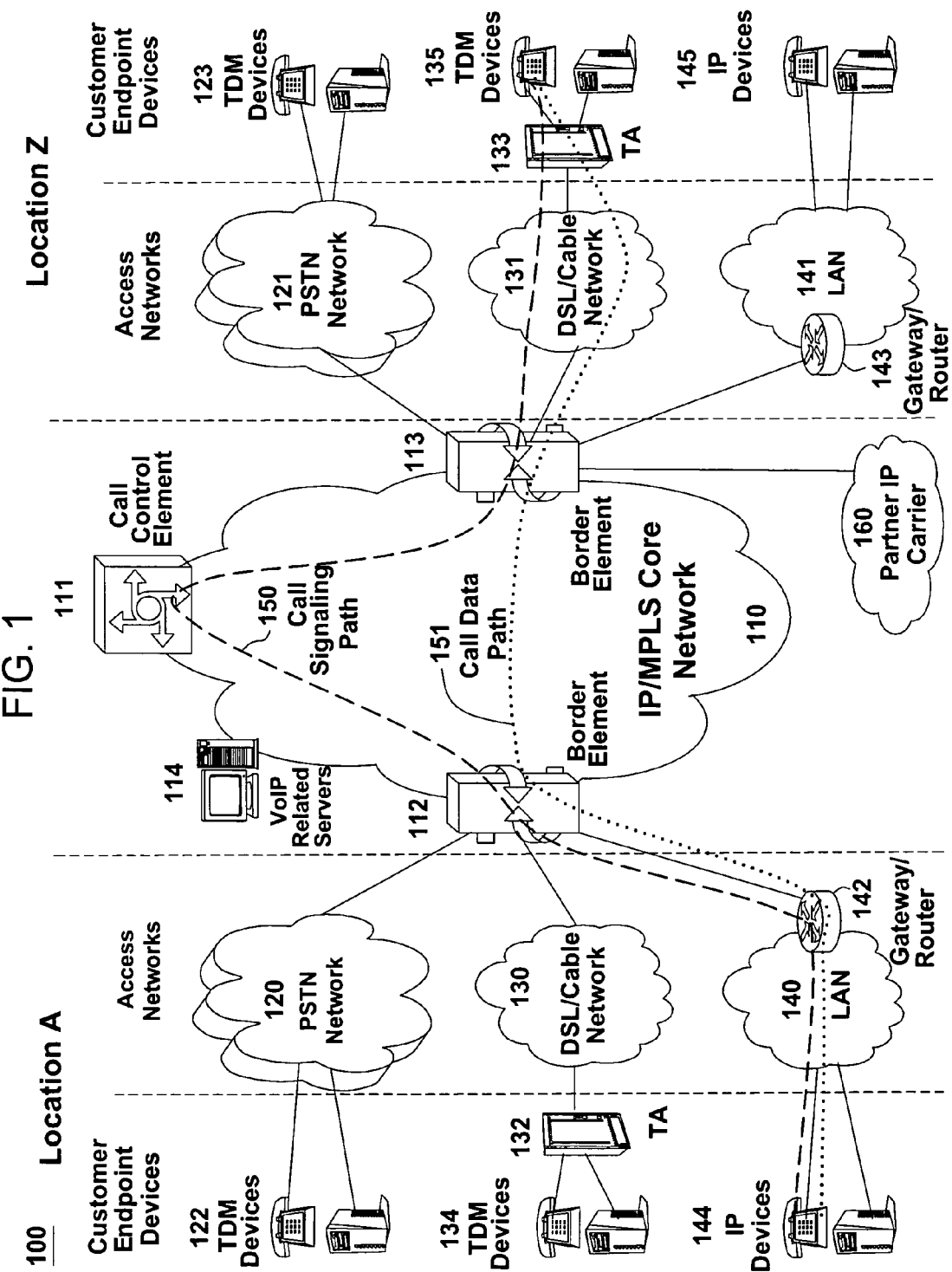
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Brief surges or spikes in call volumes in a VoIP network can often produce cascading events that lead to serious service disruptions that may not occur instantly with the overload condition. For example, an unusual, rapid increase in call volumes may be caused by a one-time event that is quickly over but gradually produces service deteriorations due to increases in queue size and limitations in capacity in a subset of network elements. It is sometimes difficult for network operators to detect the root cause of cascading network problems produced by surges since they often do not occur in parallel with the traffic spike.

To address this need, the present invention enables a graphical display of network call volumes in a predefined period before and after network alarm indications that show serious service disruptions to help determine if surges in call volumes precipitated the service disrupting event. When a surge of call volumes occurs and subsides, the graphical display of current network call volumes can be compared against historical trends of normal call traffic volumes and rates. The network will be placed in a high alert state and monitored for the predefined period of time. If the comparison shows aberrations between the historical trends and the current trend within the predefined period time window, then the network operator will be informed to take actions.

Figure 2:
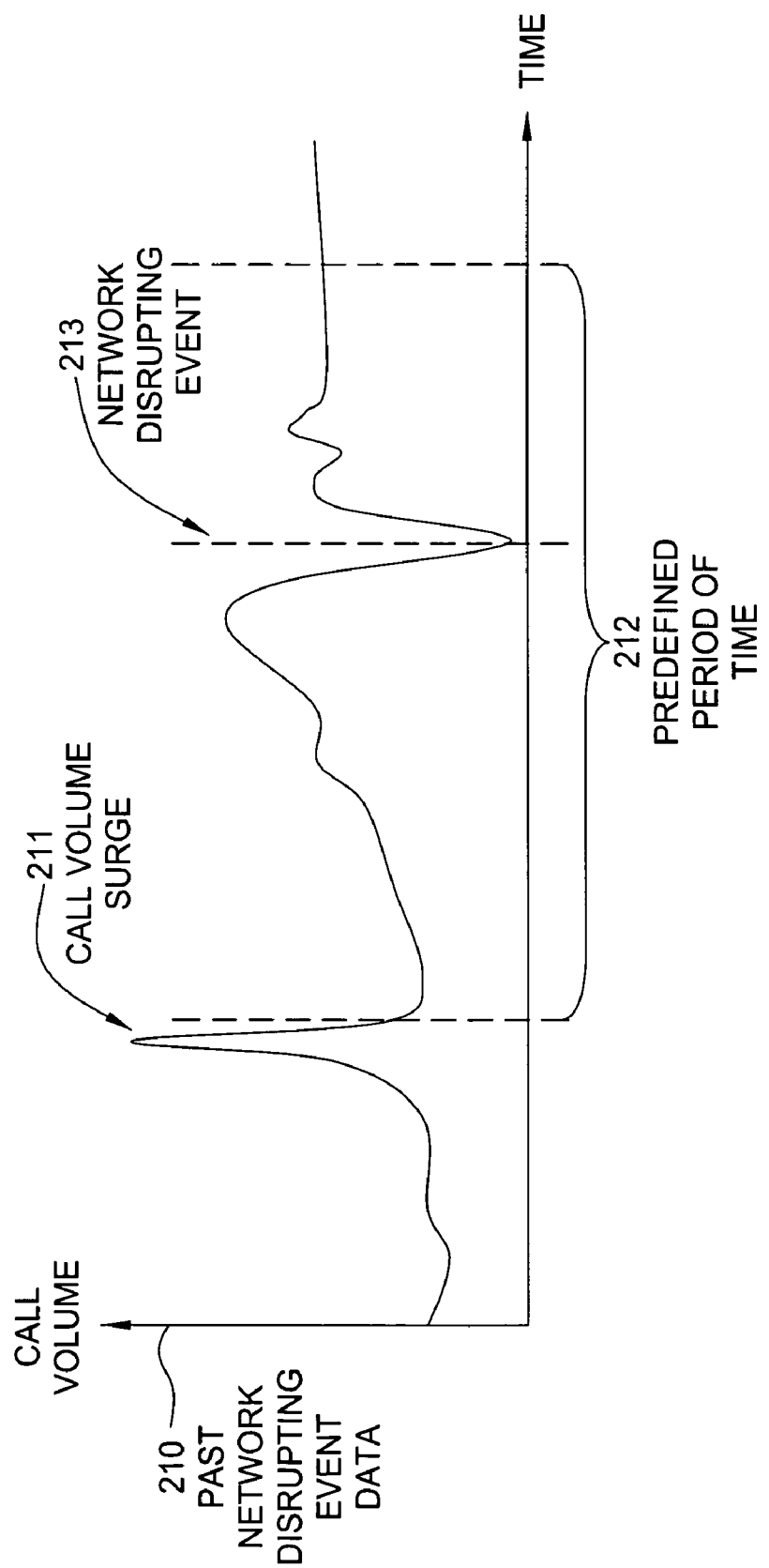
FIG. 2 illustrates an example of a graphical plot of a past network disrupting event data in a VoIP network of the present invention.

FIG. 2 illustrates an example of a graphical plot of a past network disrupting event call traffic data in a packet switched network, e.g., a VoIP network. In FIG. 2, event 211 shows a call volume surge in the network and event 213 shows the occurrence of a network disrupting event. Based on the obtained data from a past network disrupting event, the network operator uses the graphical plot to determine the predefined period of time window 212 that extends from immediately after the traffic surge, event 211, subsides to some time after the network disrupting event 213 is over and the network has returned to normal operations. The predefined period of time window 212 will be used as the time window of observation for monitoring of future network events.

Figure 3:
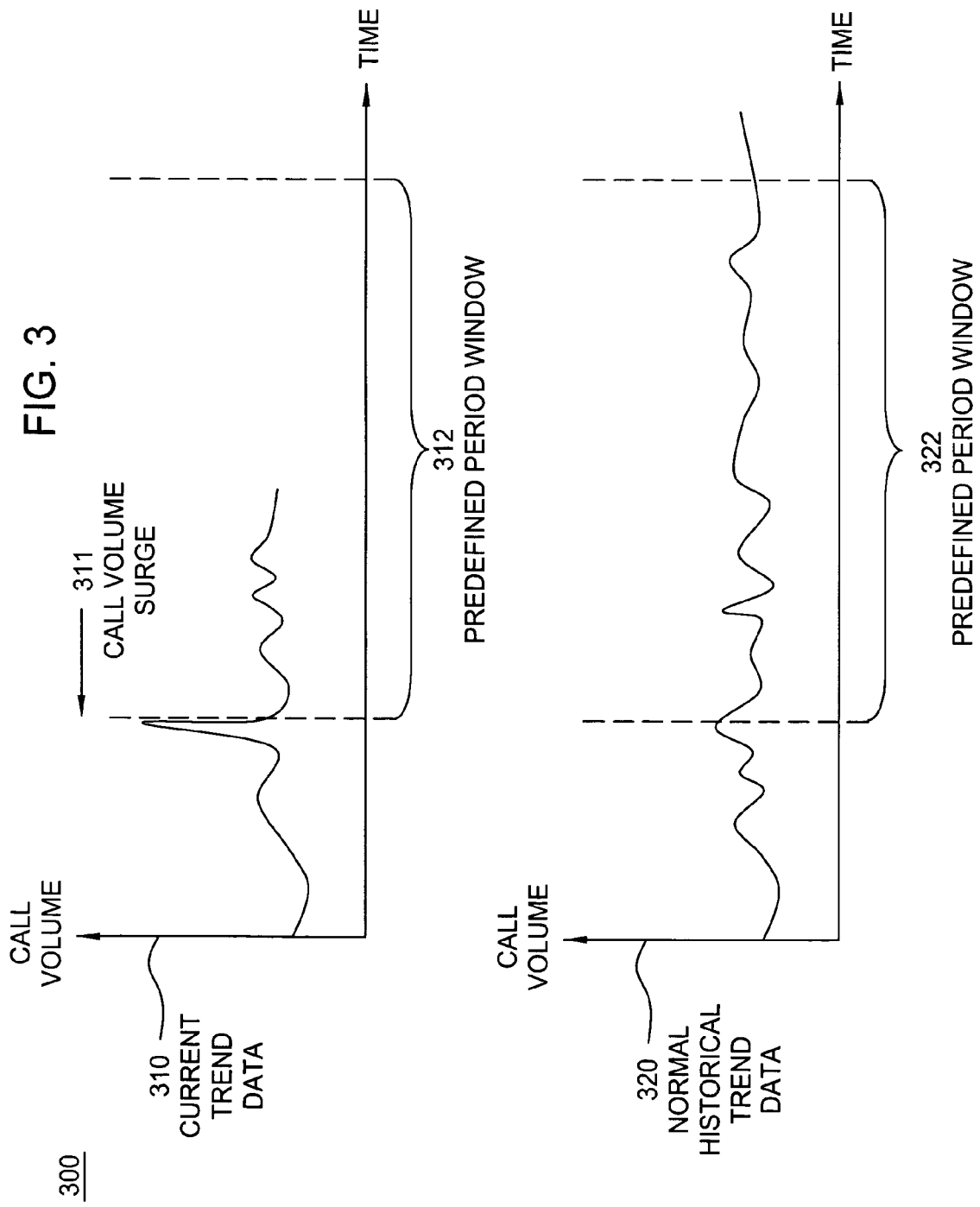
FIG. 3 illustrates an example of graphical plots of current call traffic data trend and historical call traffic data trend in a VoIP network of the present invention.

FIG. 3 illustrates an example of graphical plots of current call traffic data trend and historical call traffic data trend in a packet switched network, e.g., a VoIP network. In FIG. 3, plot 310 shows the current call traffic data trend and plot 320 shows the historical call traffic data trend. The historical call traffic data trend used can be data from the same time period of the previous day or the same time period of the previous week. Event 311 shows a call traffic volume surge that occurs in the network. Once the surge subsides, the network will immediately be placed in a high alert state and begin to monitor the ongoing call traffic volume data trend for the predefined period of time 312 previously determined by the network operator using past call traffic trend data. During this predefined period of time window, the network compares the normal historical call traffic trend data 320 with the current call traffic trend data 310. If the comparison shows aberrations between the two trends, the network operator will be informed of the occurrence of such aberrations.

Figure 4:
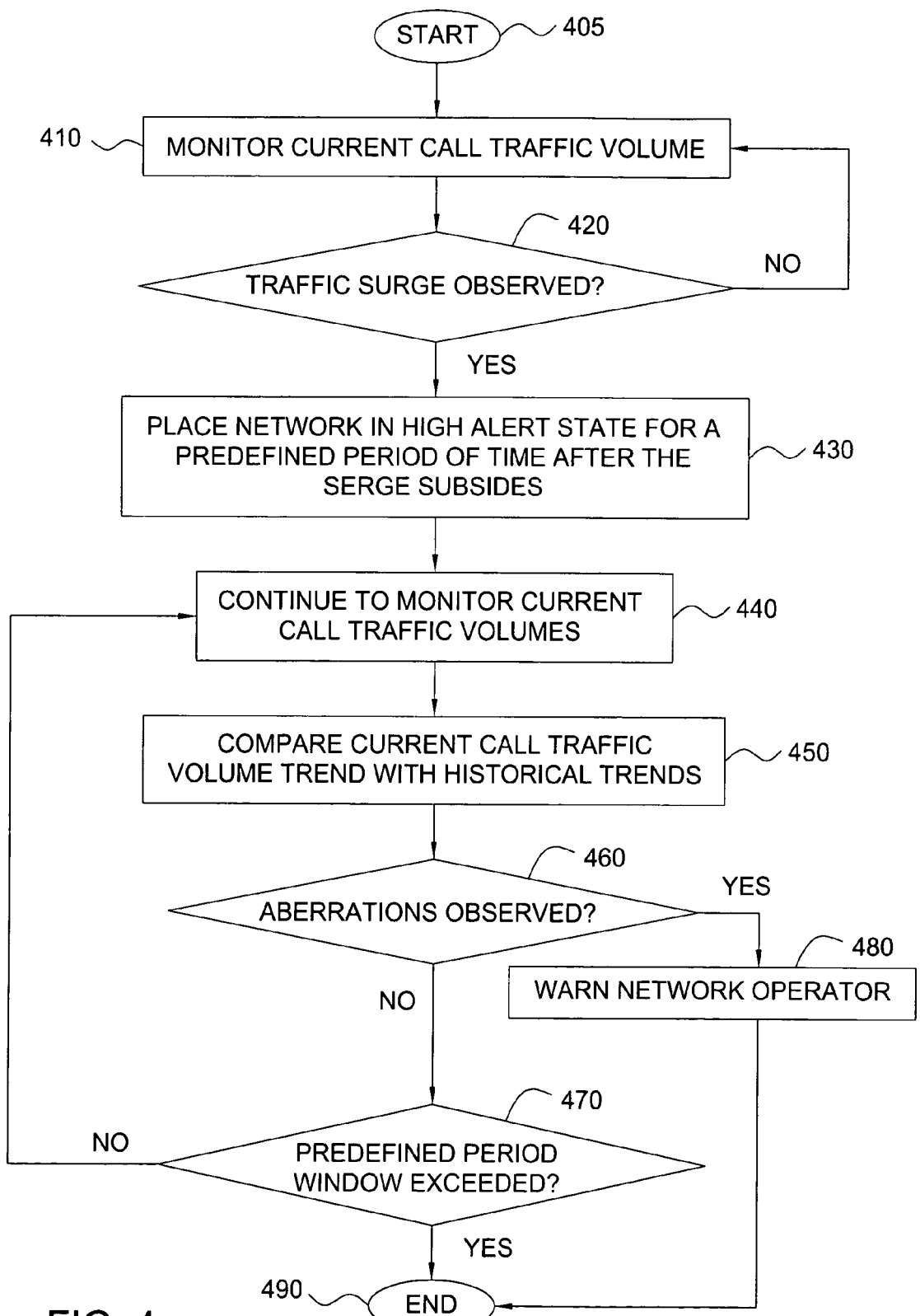
FIG. 4 illustrates a flowchart of a method for monitoring the potential impact of traffic surges in a VoIP network of the present invention.

FIG. 4 illustrates a flowchart of a method for monitoring the potential impact of traffic surges in a packet switched network, e.g., a VoIP network. Method 400 starts in step 405 and proceeds to step 410.

In step 410, the method monitors the current call traffic volumes. In step 420, the method checks if a call traffic volume surge has been observed. If a call traffic volume surge has been observed, the method proceeds to step 430; otherwise, the method proceeds back to step 410. In step 430, the method places the network in a high alert state for a predefined period of time immediately after the call traffic surge subsides. The length of the predefined period is determined by the network provider from a past network disrupting event caused by a traffic surge. In step 440, the method continues to monitor current call traffic volumes. In step 450, the method compares the current call traffic trend with one or more historical call traffic volume trends. In step 460, the method checks if aberrations are detected in the comparison. If aberrations are detected in the comparison, the method proceeds to step 480; otherwise, the method proceeds to step 470. In step 470, the method checks if the predefined period of time window has expired. If the predefined period of time window has expired, the method proceeds to step 490; otherwise, the method proceeds back to step 440. In step 480, the network sends a warning to the network operator regarding the observed aberrations. The method ends in step 490.

Figure 5:
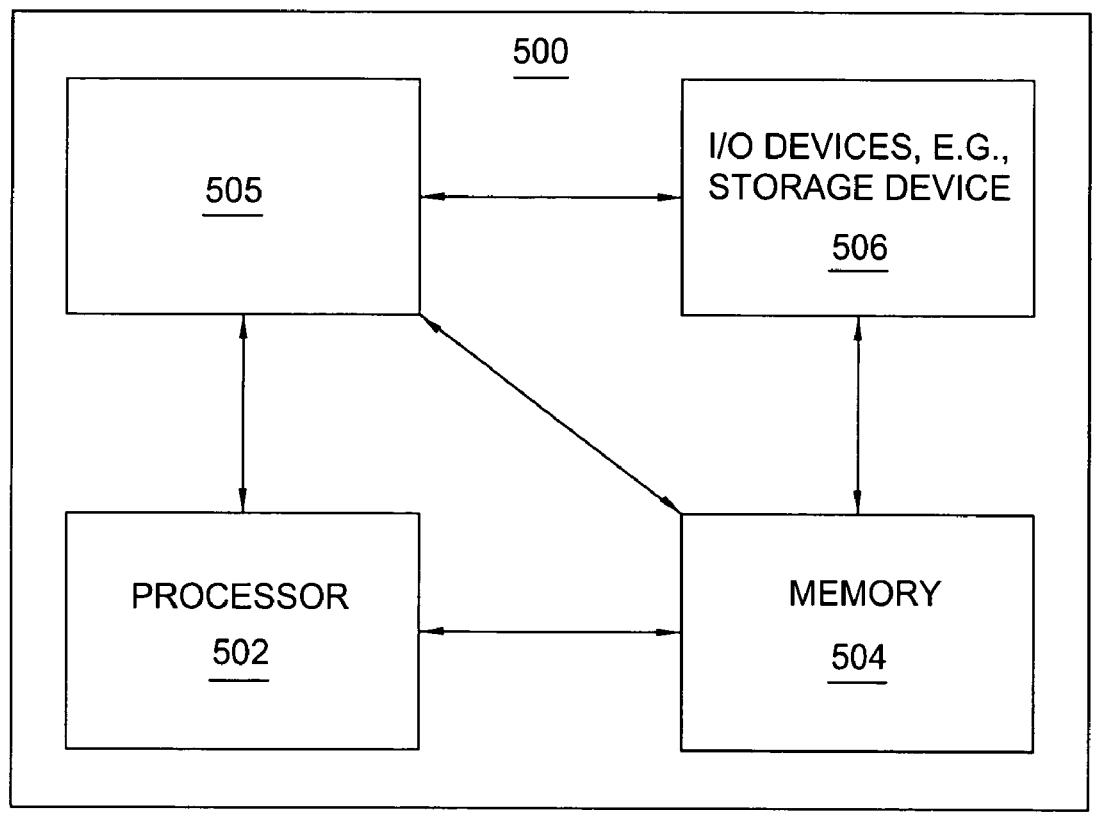
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a monitoring potential impact of traffic surges module 505, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present monitoring potential impact of traffic surges module or process 505 can be loaded into memory 504 and executed by processor 502 to implement the functions as discussed above. As such, the present monitoring potential impact of traffic surges process 505 (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for monitoring traffic surges in a communication network, comprising:
   monitoring a current call setup traffic volume after a traffic surge has occurred in said communication network;
   comparing said current call setup traffic volume with a historical call setup traffic volume for a predefined period of time, wherein said comparing comprises comparing said current call setup traffic volume in a graphical plot against said historical call setup traffic volume in a graphical plot for said predefined period of time after said traffic surge has occurred, wherein said predefined period of time is determined based on at least one previous service disrupting event, wherein said predefined period of time is determined from a first point in time immediately after a traffic surge to a second point in time after said at least one previous service disrupting event, where said communication network has returned to a normal operating state; and
   raising an alarm if said comparison shows an aberration.

2. A computer-readable medium having stored thereon a plurality of instructions, the plurality of instructions including instructions which, when executed by a processor, cause the processor to perform the steps of a method for monitoring traffic surges in a communication network, comprising:
   monitoring a current call setup traffic volume after a traffic surge has occurred in said communication network;
   comparing said current call setup traffic volume with a historical call setup traffic volume for a predefined period of time, wherein said comparing comprises comparing said current call setup traffic volume in a graphical plot against said historical call setup traffic volume in a graphical plot for said predefined period of time after said traffic surge has occurred, wherein said predefined period of time is determined based on at least one previous service disrupting event, wherein said predefined period of time is determined from a first point in time immediately after a traffic surge to a second point in time after said at least one previous service disrupting event, where said communication network has returned to a normal operating state; and
   raising an alarm if said comparison shows an aberration.

3. A system for monitoring traffic surges in a communication network, comprising:
   means for monitoring a current call setup traffic volume after a traffic surge has occurred in said communication network;
   means for comparing said current call setup traffic volume with a historical call setup traffic volume for a predefined period of time, wherein said comparing means comprises means for comparing said current call setup traffic volume in a graphical plot against said historical call setup traffic volume in a graphical plot for said predefined period of time after said traffic surge has occurred, wherein said predefined period of time is determined based on at least one previous service disrupting event, wherein said predefined period of time is determined from a first point in time immediately after a traffic surge to a second point in time after said at least one previous service disrupting event, where said communication network has returned to a normal operating state; and
   means for raising an alarm if said comparison shows an aberration.

* * * * *